United States Patent
Keskitalo et al.

(10) Patent No.: US 11,395,320 B2
(45) Date of Patent: Jul. 19, 2022

(54) PREDICTIVE SCHEDULING REQUEST OR BUFFER STATUS REPORT FOR WIRELESS BACKHAULING

(71) Applicant: Nokia Solutions and Networks Oy, Espoo (FI)

(72) Inventors: Ilkka Keskitalo, Oulu (FI); Esa Tiirola, Kempele (FI); Juha S. Korhonen, Espoo (FI); Esa Malkamäki, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/409,475

(22) Filed: May 10, 2019

(65) Prior Publication Data

US 2019/0357247 A1 Nov. 21, 2019

Related U.S. Application Data

(60) Provisional application No. 62/673,419, filed on May 18, 2018.

(51) Int. Cl.
*H04W 72/12* (2009.01)
*H04W 28/02* (2009.01)
*H04W 72/14* (2009.01)

(52) U.S. Cl.
CPC ... *H04W 72/1284* (2013.01); *H04W 28/0278* (2013.01); *H04W 72/14* (2013.01)

(58) Field of Classification Search
CPC .............. H04W 72/14; H04W 72/1284; H04W 28/0278
See application file for complete search history.

(56) References Cited

U.S. PATENT DOCUMENTS

| | | | |
|---|---|---|---|
| 2010/0322144 A1* | 12/2010 | Lee | H04B 7/155 370/315 |
| 2011/0269393 A1 | 11/2011 | Ostergaard et al. | |
| 2019/0110224 A1* | 4/2019 | Yasukawa | H04W 72/14 |
| 2019/0208539 A1* | 7/2019 | Christoffersson | H04W 4/06 |

OTHER PUBLICATIONS

Extended European Search Report received for corresponding European Patent Application No. 19174491.1, dated Sep. 6, 2019, 7 pages.
"Discussions on Buffer Status Report Over Un Interface", 3GPP TSG RAN WG2 #70, R2-102859, Agenda :7.2.5, ETRI, May 10-14, 2010, pp. 1-3.
"New SID Proposal: Study on Integrated Access and Backhaul for NR", 3GPP TSG-RAN meeting #75, RP-170821, Agenda: 9.1, AT&T, Mar. 6-9, 2017, 5 pages.
Communication pursuant to Article 94(3) EPC issued in corresponding European Patent Application No. 19 174 491.1, dated Dec. 18, 2020.

* cited by examiner

*Primary Examiner* — Kevin C. Harper
*Assistant Examiner* — Henry Baron
(74) *Attorney, Agent, or Firm* — Squire Patton Boggs (US) LLP (57) ABSTRACT

Systems, methods, apparatuses, and computer program products for supporting or providing wireless backhauling are provided.

14 Claims, 6 Drawing Sheets

PREDICTIVE SCHEDULING REQUEST OR BUFFER STATUS REPORT FOR WIRELESS BACKHAULING

CROSS REFERENCE TO RELATED APPLICATIONS

This application claims priority from U.S. Provisional Application No. 62/673,419, filed on May 18, 2018. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to wireless backhauling or self-backhauling in such communications systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

BRIEF DESCRIPTION OF THE DRAWINGS

For proper understanding of example embodiments, reference should be made to the accompanying drawings, wherein.

SUMMARY

In a first aspect thereof the exemplary embodiments of this invention provide a method that comprises transmitting, by a network node, to a serving node a scheduling request or other corresponding message based on buffer status and a predicted amount of data to be received by the network node.

In a further aspect thereof the exemplary embodiments of this invention provide an apparatus that comprises at least one data processor and at least one memory that includes computer program code. The at least one memory and computer program code are configured, with the at least one data processor, to cause the apparatus, at least to transmit, by the apparatus, to a serving node a scheduling request or other corresponding message based on buffer status and a predicted amount of data to be received by the apparatus.

In another aspect thereof the exemplary embodiments of this invention provide a computer program product comprising at least one computer-readable storage medium having executable computer-readable program code portions stored therein, the computer-readable program code portions comprising a program code portion configured to transmit, by the computer program product, to a serving node a scheduling request or other corresponding message based on buffer status and a predicted amount of data to be received by the computer program product.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for supporting wireless backhauling, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

5G NR will be able to allow for network deployment with minimized manual efforts and with as much automated self-configuration as possible. Especially on higher frequency bands, coverage will be an issue and specific capabilities are needed for NR to enable easy coverage extension with minimized or no requirements for network (re-)planning in a fast and cost-effective manner. For at least these reasons, NR includes a requirement to support wireless backhauling, and/or self-backhauling, where the NR carrier is used for the backhauling of sites without a wired or fiber connection. A specific relaying node (RN), also called an Integrated Access and Backhaul (IAB) node, may be used to provide a wireless backhaul connection (instead of having a wired connection) to a "donor" base station having a fixed connection to the network backhaul. The serving base station(s) will have the overall control of the usage of the radio resources. Further, the half-duplex constraint on the time division duplex (TDD) band needs to be considered, which causes additional restrictions to the radio resource utilization. There are two main variants for half-duplex operation: (1) a variant where backhaul and access links are multiplexed by means of time division multiplexing (TDM) and (2) a variant where backhaul and access links are multiplexed by means of frequency division multiplexing (FDM) and/or spatial division multiplexing (SDM).

Certain example embodiments provide a solution for resource allocation and scheduling for upstream backhaul link with optimized resource utilization, and minimized latencies with low processing requirements. An embodiment also supports multi-hops for wireless backhaul connections, thereby allowing deployment of various network topologies.

The relaying approach, which is being studied in third generation partnership project (3GPP), can be either in-band or out-band backhauling. In-band backhauling shares the same carrier and radio resources for the access and backhaul links Out-band backhauling separates the carriers for access and backhaul and, therefore, the operation on the backhaul link can be a subset of in-band self-backhauling. Certain embodiments may be applicable in at least both these cases, as well as a relaying via UE scenario, and can, therefore, be considered as a generic solution for any wireless relaying options.

For "self"-backhauling in a TDD system, where the radio resources are shared on the same carrier for both access and backhaul, several issues may need to be considered. These issues may include: the half-duplex constraint in the RN, the efficient sharing of radio resources between access UEs and backhaul links (should consider the resource allocation through a chain of multiple RNs in a multi-hop scenario, and scheduling of resources especially on upstream BH link from RN to serving node that can be a donor or other RN), the interference issues between the access and backhaul links, the different timing for access and backhaul links at the RN, and the monitoring of possible candidate cells/links for alternative/candidate backhaul connections.

In a normal procedure for uplink (UL) scheduling, a UE sends a scheduling request (SR) or buffer status report (BSR) to the serving node when there is UL data pending. A BSR is sent in the cases where the UE has a valid physical uplink shared channel (PUSCH) allocation, and SR is sent in the opposite cases. SR is a one-bit indication of the need of UL resources, while BSR contains more detailed information on the amount and type of data in the buffer. As a response, the serving node sends a resource grant for radio resources that the UE should use for data transmission.

However, there are also issues when applying a basic procedure for the integrated access and backhaul (IAB, term used in 3GPP for wireless self-backhauling, IAB Study Item for NR Rel. 15) operation. For example, a RN itself may be responsible for scheduling on the access link in the cell served by itself, and scheduling of the downstream backhaul connection both in uplink and downlink directions. In some scenarios, a donor gNB may have a role in resource allocating for the entire relay chain (such as the example of FIG. 1 discussed below). For example, a donor gNB may coordinate the backhaul/access split and/or well link direction (UL/DL) for the entire relay chain. Also, the half-duplex constraint causes delays sending upstream SRs/BSRs, receiving SRs/BSRs on access and downstream backhaul connections, receiving grant from the serving node, and sending grants to the served UEs or other downstream RNs.

Applying a normal scheduling procedure while considering the issues above for the relaying operation, the resulting procedure would have the following steps: (1) UEs and/or served RN nodes send SRs/BSRs to the serving RN, (2) RN sends (PUSCH) resource grants corresponding the received SRs/BSRs, (3) UEs and/or served RN nodes send UL data in the granted radio resources, (4) RN collects data from all served connections (the amount of data in the RN's buffer is known at this stage), (5) RN sends a SR/BSR to serving Donor/RN (the SR/BSR is based on the actual amount of data in RN's buffer), (6) serving node sends UL grant to the RN, and (7) RN sends UL data according to resource grant.

The above procedure can be further delayed if a UE or served RN does not have UL grant when new data becomes available. In this case, the UE or served RN first sends SR and, based on that, RN provides a UL grant to send the BSR and, only after that, provides the UL grant to send the actual data. There can be one or more slot delay between each of the 7 steps of the above scheduling procedure depending of the resource allocation for backhaul (upstream/downstream) and access links. Furthermore, in the multi-hop scenario, these 7 steps would need to be repeated for each hop.

Figure 1:
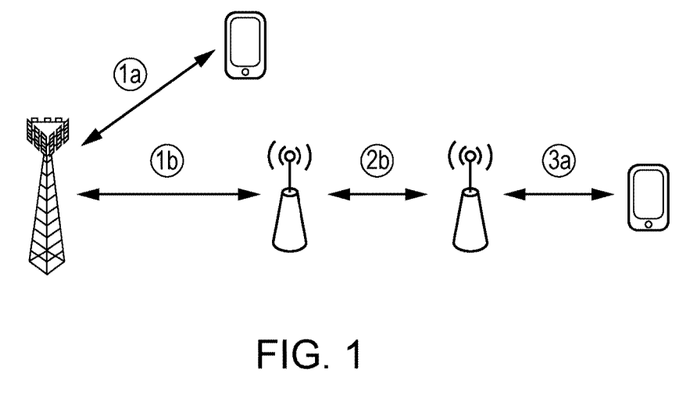
FIG. 1 illustrates an example multi-hop self-backhaul scenario, according to an embodiment.
Figure 2:
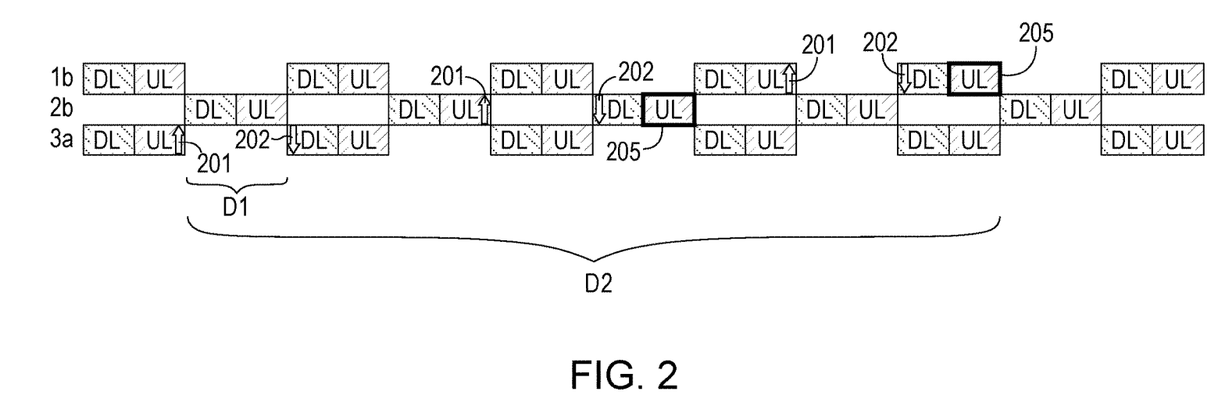
FIG. 2 illustrates the timing of a two-hop relaying scenario, according to an embodiment.

FIG. 1 illustrates an example multi-hop self-backhaul scenario where the access links share the same carrier with the backhaul connections. One solution to cope with the issues of self-backhauling in a multi-hop scenario is to have time division multiplexed (TDM) resources for access and backhaul. Also, the UL/DL duplexing should be aligned on each link to avoid network level interference in a TDD system. FIG. 2 illustrates an example of a solution having a fixed split of radio resources between access and backhaul.

FIG. 2 depicts the timing of a two-hop relaying scenario (as illustrated in FIG. 1) where the arrows 201 indicate SR/BSR sent on UL connection and the arrows 202 indicate a scheduling grant sent on DL connection. The framed slots 205 are the slots where the UL data is sent corresponding to indicated SRs/BSRs/grants. D1 represents the required time for the RN to process the SR or BSR and define the UL grant for the following UL slot. In the example of FIG. 2, UL grant cannot be sent in a DL immediately following the UL SR/BSR due to the time needed for processing. The same procedure may be repeated first in the access link 3a and the upstream backhaul links 2b and 1b. In this example, the total delay D2 from the first SR/BSR on link 3a until the data is sent to the donor node over backhaul link 1b is 16 slots. This is only a one-way delay over the radio connections and the round-trip-time (RTT) will become prohibitively large to meet the 5G requirements. The delay becomes even worse with a larger number of backhaul hops, and there might not be a specified limit for the number of hops in the third generation partnership project (3GPP) specifications. It should be understood that the UL data can also be just a higher layer acknowledgement (ACK) to a DL packet where the RTT is very large due to delays over multiple hops resulting in degraded throughput also in the DL direction (e.g., due to slow start of TCP).

In view of the above, it is clear that legacy methods applied in the relaying scenario will not reach satisfactory performance for 5G services especially as minimized latency is of paramount importance. Furthermore, the self-backhauling should support multi-hop relaying, which means that the latency issues will be multiplied by the number of hops. Also, the scheduling over the backhaul links, and all latencies there, will affect all UEs served in the downstream cells, i.e., the delays will impact the quality of service of every end user connection. Accordingly, the current scheduling framework applied for scheduling PUSCH in a multi-hop backhaul network is not sufficient from at least a latency point of view.

Certain embodiments are directed to a process for providing predictive scheduling request(s) and/or buffer status report(s). In one embodiment, a UL scheduling grant is sent to a downstream RN or UE, and a scheduling request or BSR is sent to the upstream serving node (e.g., a donor node or RN), where the resource scheduling request (or BSR) on the upstream link is based on a scheduling grant on the downstream backhaul and access links. This approach can be considered as a predictive SR or BSR since the RN does not yet have the data in its (UL) buffer.

In some embodiments, the RN may send upstream SR or BSR prior to receiving UL data in the UL buffer. In an embodiment, there may be a linkage between SR/BSR sent in the upstream, and the amount of PUSCH resources allocated to slot(s) K requiring backhaul uplink transmission in slot(s) M. According to certain embodiments, the upstream RN or the donor may take into account the predictive SRs or BSRs received from the downstream nodes (e.g., UEs, RNs) when allocating UL resources for the downstream node(s).

As a result of this approach, the upstream scheduling latency will be minimized Additionally, no resources are wasted and no additional interference is generated.

Figure 3:
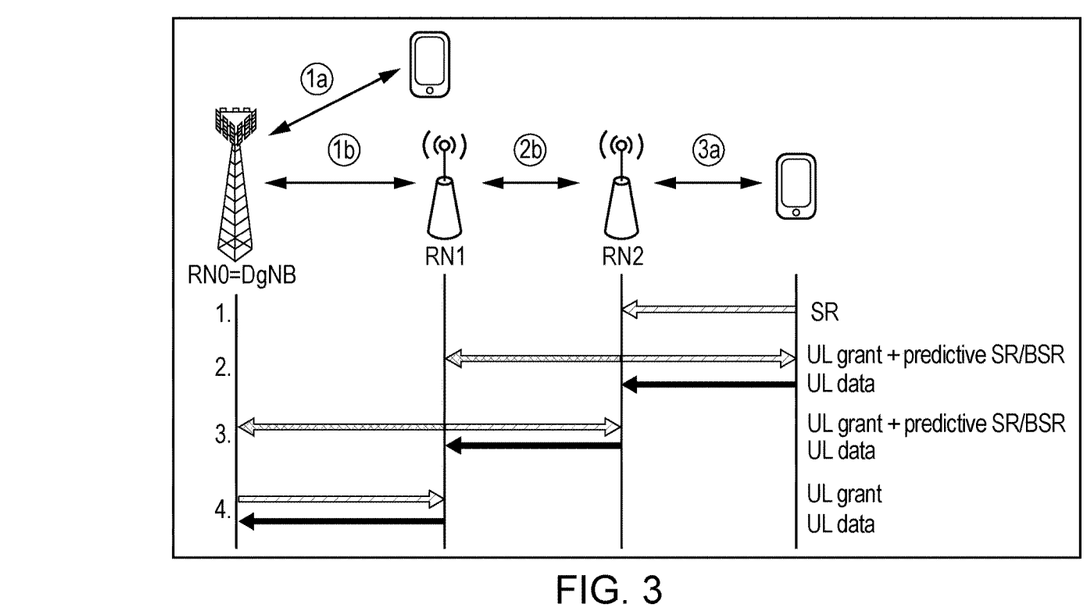
FIG. 3 illustrates an example signaling diagram, according to one embodiment.

FIG. 3 illustrates an example signaling diagram, according to one embodiment. For simplicity, in the example of FIG. 3, only one UE is depicted sending UL data. However, any number of UEs or RNs may be involved according to certain embodiments.

As illustrated in the example of FIG. 3, at 1, one or more UE(s) may send SR or BSR towards RN2 using access link uplink resources. Based on the received SR or BSR, at 2, RN2 may schedule UL resources for the UE(s). In addition, before receiving scheduled UL data from the UE(s), RN2 may send SR or BSR to RN1.

According to certain embodiments, at least three timing options may be available for the predictive SR/BSR timing with respect to UL grant timing. The timing option used may be selected based on the scenario (including, e.g., frame structure/availability of resources, processing times at RN/DgNB and the RN/DgNB scheduling decision). The first timing option is that the SR/BSR is sent before UL grant. The second timing option is that the SR/BSR is sent at the same time as UL grant (as shown in FIG. 3). In one embodiment, SR/BSR and UL grant may be confined as a signal. The third timing option is that the SR/BSR is sent after UL grant but before data is received on the granted UL resources.

In an embodiment, when RN2 sends SR/BSR to RN1, RN2 may indicate SR/BSR in a UE/RN-specific manner Another option is to send one combined SR/BSR from the RN2.

According to another embodiment, when RN2 sends SR/BSR to RN1, RN2 may indicate the traffic volume so that RN1 is able to allocate correct amount of resources for the next scheduling. In one embodiment, semi-persistent backhaul UL resources may be configured and at least partially used for carrying BSRs.

In one embodiment, SR/BSR may also indicate the receive (Rx) time of the UL data scheduled by RN2. This allows RN1 to schedule backhaul UL such that RN1 has sufficient processing time to process the UL packet(s).

Then, as depicted in the example of FIG. 3, after SR/BSR is sent to RN1, RN2 receives UL data from the UE(s) according to the scheduled UL grant.

According to an embodiment, in the multi-hop case, step 2 of FIG. 3 may be repeated for each hop. Based on the received SR/BSR, RN(n−1) may schedule UL resources for RN(n), where n is the order number of the RN in a multi-hop relaying chain. In the example of FIG. 3 where there are 2 RNs in the multi-hop chain, n=2 for the last RN (RN2 of FIG. 3). It should be noted that UL scheduling grant allocating PUSCH for 2b may have also been sent before reception of PUSCH in 3a. In an embodiment, at 3, before receiving scheduled UL data, RN(n−1) may send the predictive SR/BSR to RN(n−2). RN(n−2) may then receive UL data from RN(n−1) according to the scheduled UL grant. As further illustrated in the example of FIG. 3, at 4, RN(n−2) may send UL grant and then receive UL data.

In some embodiments, the process can be repeated at each hop of the relay chain. Further, a RN may serve more than one downstream RN nodes (in a tree topology) where the UL scheduling can take into account the scheduling requests from all served RNs when scheduling radio resources to each backhaul link.

According to certain embodiments, in order to trigger the predictive SR/BSR, a new SR/BSR trigger may be introduced. Currently, regular BSR is triggered when new UL data becomes available for a logical channel with higher priority than any logical channel having available data or when there was no data available. In one embodiment, the new SR/BSR trigger may include triggering BSR by a RN when that RN sends UL grant to UE(s)/RN(s) served by that RN. Also, in one example, the data volume calculation may be updated to also take into account, in addition to the already available data, the predicted amount of data.

In an embodiment, a RN can send a predictive SR without knowing what data will be received based on the UL grants RN has sent. A BSR may contain information about the logical channel groups for which UL data is available. When a RN constructs a predictive BSR, it does not necessarily yet know for which logical channels and how much for each it will receive data based on the UL grant it has sent in downstream. The RN only knows the total amount of data to be sent based on the UL grant unless it already received a BSR (and not just SR) from downstream (access UE or RN). If the RN has received a BSR, it may easily predict, based on the logical channel priorities, which data it will receive. If a BSR has not been received, then the RN only knows the total amount of data it will receive but not for which logical channels or logical channel groups that data belongs to. In that case, predictive BSR may indicate which data volume is for real data and which data volume is for predictive data. One option is to allocate one logical channel group (LCG) for predictive data and others for already buffered real data. Alternatively, a new buffer status (BS) field can be added for the predictive data volume. There may be an indication in the predictive BSR indicating that this BSR is a predictive BSR, i.e., containing buffer status that is, at least partly, based on prediction. The indication may be separately for each BS, i.e., for each LCG, or there could be a single indication for the whole BSR. The indication may be explicit, for instance, a bit field in the BSR, or it may be based on configuration, such as if one (or more) LCG is reserved for reporting predictive BS.

In an embodiment, when a RN or donor gNB receives the BSR, it may take different actions based on the knowledge of whether the BSR is normal or predictive. The RN or gNB scheduler may, for instance, prioritize the real data over the predictive data or take only high priority predictive data into account. The scheduler actions are typically not standardized.

According to one example, the use of predictive BSR may be configurable by the network, i.e., in the RRC specification there may be an information element that indicates whether the RN is not allowed to or is mandated to use predictive BSR. In one embodiment, even when the network configures a RN to use predictive BSR, it may be beneficial to have an indication in the BSR itself to indicate which data volume is actual data and which data is predictive.

In one embodiment, downstream and upstream messages may be sent using one transmit (Tx) phase (e.g., slot) but using separate messages. This is a reasonable scenario for out-of-band relays. In another embodiment, downstream and upstream messages may be sent using a single message (e.g., a downstream PDCCH is monitored by an upstream node). In yet another embodiment, upstream and downstream messages may be sent using different Tx phases (e.g., slot), however in a way that an upstream message is transmitted before reception of the scheduled upstream data (scheduled via the downstream message).

Figure 4:
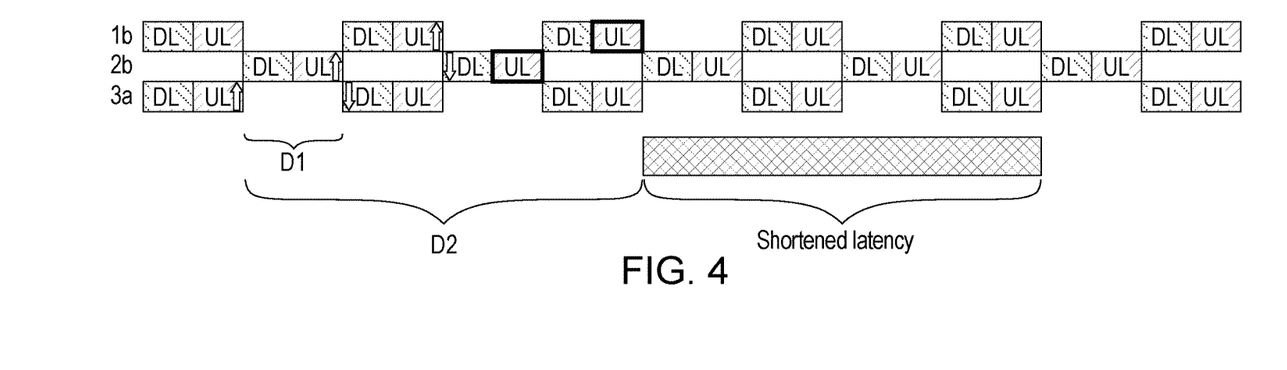
FIG. 4 illustrates an example depicting scheduling and latency, according to certain embodiments.

FIG. 4 illustrates an example depicting scheduling and latency using example embodiments described herein. In the example of FIG. 4, the second RN receiving SR/BSR from the UE on access link 3a may generate a grant (or possibly multiple grants for all served UEs) to be sent on the first possible DL slot on link 3a. The first possible DL slot may not necessarily be the next slot due to time required for processing the SR, i.e., there will be a delay D1 also in this case. What is different in the example of FIG. 4 from the baseline operation of FIG. 2, a RN (after processing all SR on 3a) may generate a corresponding SR/BSR on the upstream backhaul link 2b prior to sending the UL grant(s) for the served UEs on link 3a. Similarly, the first RN, after receiving the SR on 2b, defines the SR/BSR to be sent on link 1b—again prior to sending the UL grant on link 2b. As can be seen in the example of FIG. 4, the total latency for UL transmission over multiple links will be in practice reduced to one half of the baseline operation, i.e., 8 slots instead of 16 slots of the baseline.

It is noted that example embodiments can also be applied in the out-of-band relaying where the separation of the access and backhaul links need not to be arranged.

Figure 5:
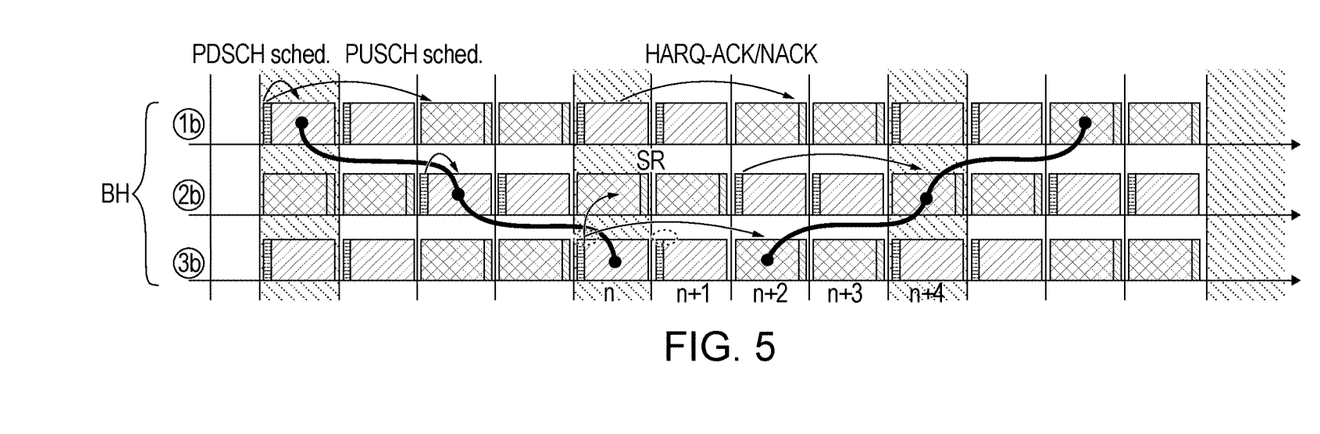
FIG. 5 illustrates an example embodiment in which downstream and upstream messages are sent using one transmit phase or slot but using separate messages.

An example of the transmission patterns for upstream and downstream resource allocation is illustrated in FIG. 5. The example of FIG. 5 illustrates an embodiment where the downstream and upstream messages are sent using one Tx phase or slot but using separate messages. In this example, the Rx/Tx pattern is designed for 50/50 allocation between upstream and downstream traffic. This pattern may contain two consecutive slots for downstream, followed by two consecutive slots for upstream. In certain embodiments, when hops with an odd number (such as 1b, 3b, . . . ) are in a downstream phase, hops with an even number (such as 2b, 4b, . . . ) are in an upstream phase, and vice versa. The example embodiment of FIG. 5 results in a good trade-off between latency and processing time requirement for the RN.

The data forwarding through a multi-hop backhaul chain is also shown in FIG. 5. On DL, the scheduling is assumed to be for the same slot (K0=0). That means the PDCCH (control part in the DL slot) may include the scheduling information for the DL data in the same slot. When the RN has received backhaul data from the serving node, it can forward the data in the following DL slot, in the illustrated example with two slot delay. The delay may be constant at every hop. RN may have at least one slot time for receiving downstream PDSCH and preparing PDCCH/PDSCH for the next hop.

In the upstream, the UL scheduling delay may be at least one slot to provide sufficient processing time to prepare the data transmission on PUSCH; in the example of FIG. 5, the UL scheduling delay is two slots (K2=2, from PDCCH to the UL slot that PDCCH grants resources for). The serving (upstream) RN should hence know before the beginning of, e.g., slot n+2 what the grant size should be for the upstream PUSCH that it will be receiving in slot n+4. According to an embodiment, that information may be provided by the served RN (located in the downstream) with a scheduling request (or scheduling information sent in the upstream) that will correspond to the UL scheduling of the next backhaul link. This means that when scheduling (over PDCCH) the UL slot of backhaul link N+1, the RN sends (or forwards) the corresponding scheduling request to the upstream RN (or Donor node) over the backhaul link N. By this, the RN in the upstream can schedule an exact UL grant for link N in the next upstream slot on that link Using this procedure, there will be no additional delays in forwarding the upstream data and the resource grants can follow the actual amount of data that is required to be transmitted. Otherwise, the UL grants should either have a fixed UL grant coping with maximum expected amount of data, or there would be extended delays in the upstream direction.

Figure 6:
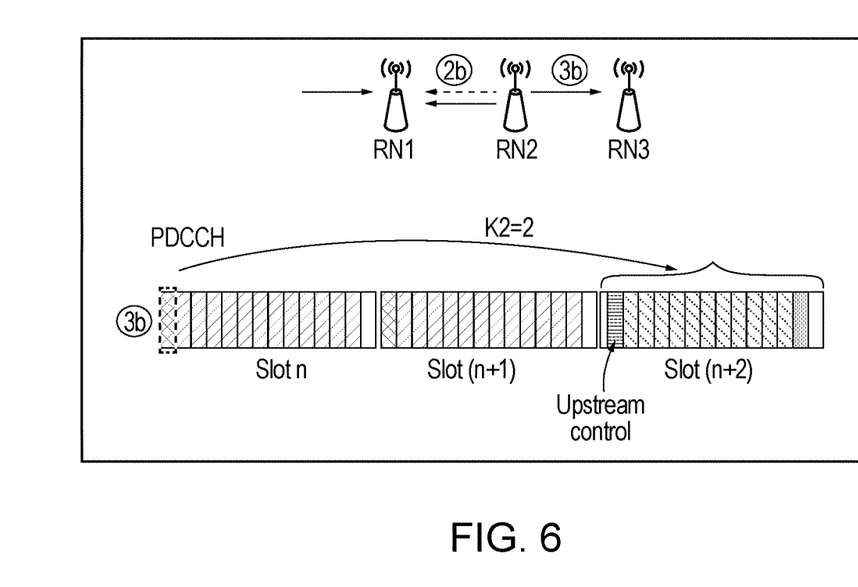
FIG. 6 illustrates an example of an embodiment in which downstream and upstream messages are sent using a single message.

FIG. 6 illustrates an example of an embodiment in which the downstream and upstream messages are sent using a single message. As illustrated in the example of FIG. 6, RN2 may send UL grant for 3b in slot n, and corresponding PUSCH may be transmitted in slot n+2. RN1 is able to monitor/receive PDCCH conveying UL grant for RN3 (in addition to receiving data in downstream/upstream). RN1 may be aware of the C-RNTI as well as DL control channel configuration of RN3, and RN1 may perform PDCCH monitoring for both upstream (RN0) and downstream (RN2). The corresponding control resource sets (CORE-SETs) may be separated in frequency and/or time. Otherwise, the process may continue similarly as in FIG. 5. A benefit of this approach is that use of a single message allows for minimizing control channel overhead.

Figure 7A:
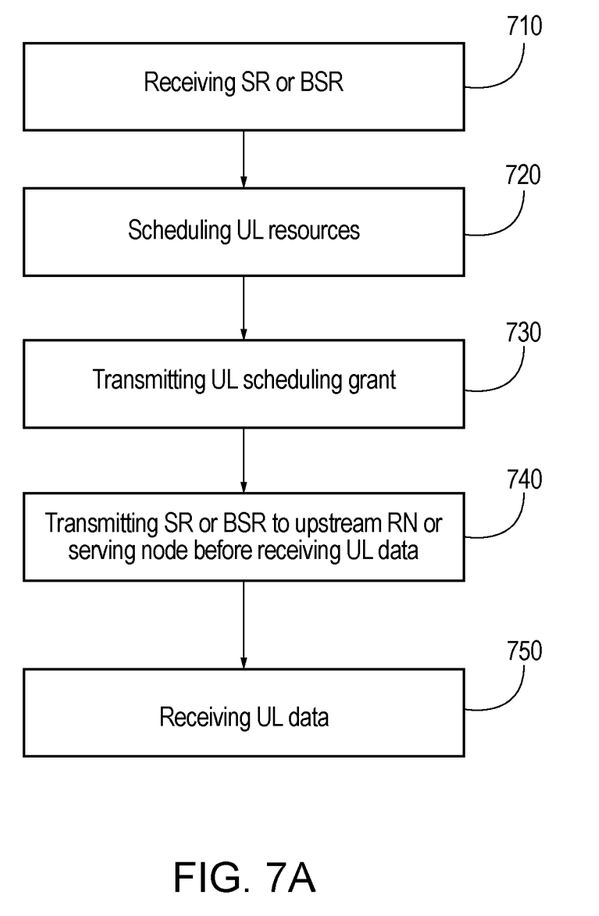
FIG. 7a illustrates an example flow diagram of a method, according to one embodiment.

FIG. 7a illustrates an example flow diagram of a method for providing wireless backhaul, according to an embodiment. In certain embodiments, the method of FIG. 7a may be performed by a network node or RN, such as a base station, gNB, eNB, or the like, for example. In one example, the method of FIG. 7a may be performed by a RN having a wireless backhaul connection. As illustrated in the example of FIG. 7a, the method may include, at 710, receiving a SR or other corresponding message, such as a BSR, from a UE or downstream RN. If the SR/BSR is 710 is received from a UE, then it may be a conventional SR/BSR. If the SR/BSR at 710 is received from a downstream RN, then it may be predictive, i.e., corresponds to the SR/BSR at 740 of the downstream RN's procedure. In an embodiment, the method may then include, at 720, scheduling UL resources for the UE or downstream RN while taking into account the received SR or BSR when allocating the UL resources. The method may also include, at 730, transmitting a UL scheduling grant to the UE or downstream RN. According to certain embodiments, the method may further include, at 740, before receiving scheduled UL data from the UE or downstream RN, transmitting the SR or BSR to an upstream RN or the serving node. In an embodiment, there is a linkage between the SR or BSR sent in the upstream, and the amount of PUSCH allocated to slot(s) K requiring backhaul UL transmission in slot(s) M. Thus, the information in the SR or BSR transmitted to the upstream RN or serving node may be based on the future expected buffer status for upstream traffic.

According to certain embodiments, the transmitting 740 of the SR or BSR to the upstream RN or serving node may include transmitting the SR or BSR before transmitting the UL scheduling grant, transmitting the SR or BSR at the same time as the UL scheduling grant (e.g., confined in a single signal), or transmitting the SR or BSR after transmitting the UL scheduling grant.

In some embodiments, the transmitting 740 of the SR or BSR to the upstream RN or serving node may further include indicating the SR or BSR in a manner specific to the UE or downstream RN. According to another embodiment, the transmitting 740 of the SR or BSR to the upstream RN or serving node may include indicating the traffic volume so that the upstream RN or serving node is able to allocate the correct amount of resources for the next scheduling. In one embodiment, semi-persistent backhaul UL resources may be configured for this purpose.

In another embodiment, the transmitting 740 of the SR or BSR to the upstream RN or serving node may further include indicating a receipt time of the scheduled UL data. This may allow the upstream RN or serving node to schedule backhaul UL in a manner that the upstream RN or serving node has sufficient processing time to process the UL packet(s).

According to an embodiment, the method may then include, at 750, receiving UL data from the UE or downstream RN according to the UL scheduling grant. In some embodiments, the transmitting 740 of the SR or BSR may be triggered when the UL scheduling grant is transmitted to the UE or downstream RN.

In one embodiment, downstream and upstream messages or signaling may be sent using one Tx phase (e.g., slot) but using separate messages. In another embodiment, downstream and upstream messages or signaling may be sent using a single message. In yet another embodiment, downstream and upstream messages or signaling may be sent using different Tx phases (e.g., slot, or mini-slot), but in a way that an upstream (SR/BSR) message is transmitted before reception of the scheduled upstream data (scheduled via the downstream message).

Figure 7B:
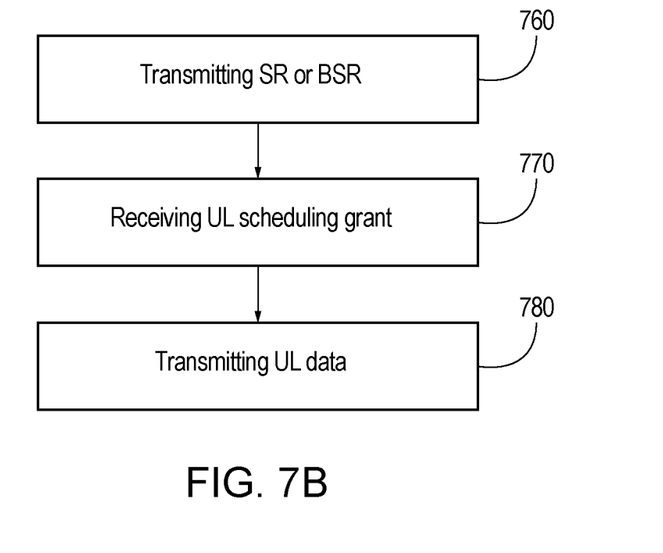
FIG. 7b illustrates an example flow diagram of a method, according to another embodiment.

FIG. 7b illustrates an example flow diagram of a method for providing wireless backhaul, according to an embodiment. In certain embodiments, the method of FIG. 7b may be performed by a UE, mobile station, mobile equipment, IoT device, or the like, for example. As illustrated in the example of FIG. 7b, the method may include, at 760, transmitting a SR or BSR to an upstream network node or relay node. The SR or BSR may be normal or predictive SR or BSR. In an example embodiment, the upstream network node or relay node may be a relay node that provides a wireless backhaul connection. The method may then include, at 770, receiving a UL scheduling grant from the upstream network node or relay node. In an embodiment, the method may also include, at 780, transmitting UL data to the upstream network node or relay node.

Figure 7C:
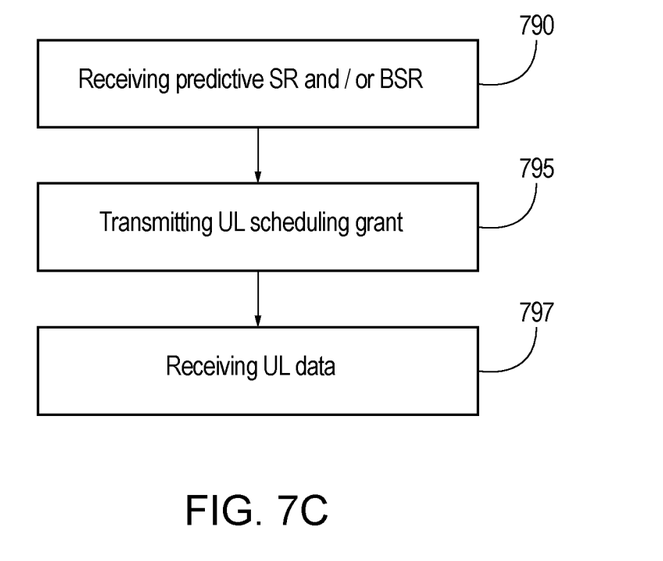
FIG. 7c illustrates an example flow diagram of a method, according to another embodiment.

FIG. 7c illustrates an example flow diagram of a method for providing wireless backhaul, according to another embodiment. In certain embodiments, the method of FIG. 7c may be performed by a donor base station, donor gNB or donor eNB, or upper hierarchy RN, with a fixed connection to the network backhaul. In an embodiment, the method may include, at 790, receiving predictive SR and/or BSR from a downstream RN. The method may then include, at 795, transmitting an UL scheduling grant based on the received predictive SR and/or BSR. The method may also include, at 797, receiving UL data from a UE or downstream RN according to the UL scheduling grant.

Figure 8A:
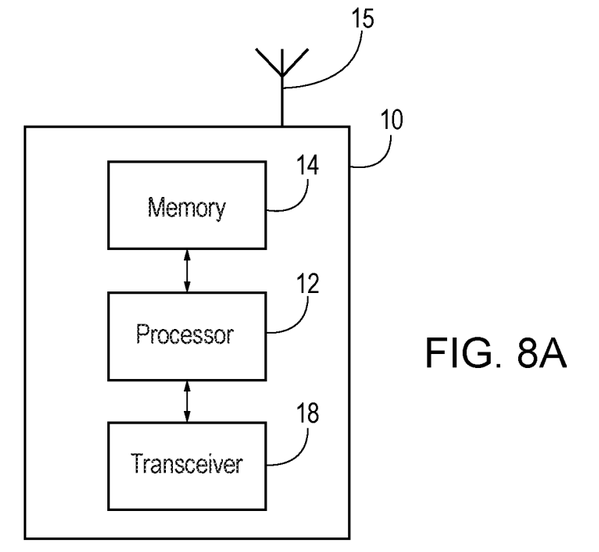
FIG. 8a illustrates an example block diagram of an apparatus, according to one embodiment.

FIG. 8a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8a.

As illustrated in the example of FIG. 8a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. For example, in certain embodiments, apparatus 10 may be a RN providing a wireless backhaul connection or may be a donor base station, gNB or eNB with a fixed connection to the network backhaul. According to example embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as the signaling diagram depicted in FIG. 3 or the flow diagrams illustrated in FIG. 7a or 7c. In certain embodiments, apparatus 10 may be configured to perform a procedure for providing wireless backhaul.

In one embodiment, apparatus 10 may be controlled by memory 14 and processor 12 to receive a SR or other corresponding message, such as a BSR, from a UE or downstream RN. In an embodiment, apparatus 10 may be controlled by memory 14 and processor 12 to schedule UL resources for the UE or downstream RN while taking into account the received SR or BSR when allocating the UL resources. According to certain embodiments, apparatus 10 may be controlled by memory 14 and processor 12 to transmit a UL scheduling grant to the UE or downstream RN. In an embodiment where apparatus 10 represents a downstream RN, apparatus 10 may be further controlled by memory 14 and processor 12 to transmit, before receiving scheduled UL data from the UE or downstream RN, the SR or BSR to an upstream RN or the serving node. According to one embodiment, there is a linkage between the SR or BSR sent in the upstream, and the amount of PUSCH allocated to slot(s) K requiring backhaul UL transmission in slot(s) M. Hence, the information in the SR or BSR transmitted to the upstream RN or serving node may be based on the future expected buffer status for upstream traffic.

According to certain embodiments, apparatus 10 may be controlled by memory 14 and processor 12 to transmit the SR or BSR to the upstream RN or serving node before transmitting the UL scheduling grant, at the same time as the UL scheduling grant (e.g., confined in a single signal), or after transmitting the UL scheduling grant.

In some embodiments, apparatus 10 may be controlled by memory 14 and processor 12 to transmit of the SR or BSR to the upstream RN or serving node in a manner specific to the UE or downstream RN. According to another embodiment, apparatus 10 may be controlled by memory 14 and processor 12 to transmit the SR or BSR to the upstream RN or serving node with an indication of the traffic volume so that the upstream RN or serving node is able to allocate the correct amount of resources for the next scheduling. In one embodiment, semi-persistent backhaul UL resources may be configured for this purpose.

In another embodiment, apparatus 10 may be controlled by memory 14 and processor 12 to transmit the SR or BSR to the upstream RN or serving node with an indication of a receipt time of the scheduled UL data. This indication of the receipt time may allow the upstream RN or serving node to schedule backhaul UL such that the upstream RN or serving node has sufficient processing time to process the UL packet(s).

According to an embodiment, apparatus 10 may also be controlled by memory 14 and processor 12 to receive UL data from the UE or downstream RN according to the UL scheduling grant. In some embodiments, the transmission of the SR or BSR by apparatus 10 may be triggered when the UL scheduling grant is transmitted to the UE or downstream RN.

In one embodiment, apparatus 10 may be controlled by memory 14 and processor 12 to transmit downstream and upstream messages or signaling using one Tx phase (e.g., slot) but using separate messages. In another embodiment, apparatus 10 may be controlled by memory 14 and processor 12 to transmit downstream and upstream messages or signaling using a single message. In yet another embodiment, apparatus 10 may be controlled by memory 14 and processor 12 to transmit downstream and upstream messages or signaling using different Tx phases (e.g., slot), but in a way that an upstream message is transmitted before reception of the scheduled upstream data (scheduled via the downstream message).

In some embodiments, apparatus 10 may represent a donor base station, donor gNB or donor eNB, or upper hierarchy RN, with a fixed connection to the network backhaul. According to this embodiment, apparatus 10 may be controlled by memory 14 and processor 12 to receive predictive SR and/or BSR from a downstream RN, to transmit an UL scheduling grant based on the received predictive SR and/or BSR, and to receive UL data from a UE or downstream RN according to the UL scheduling grant.

Figure 8B:
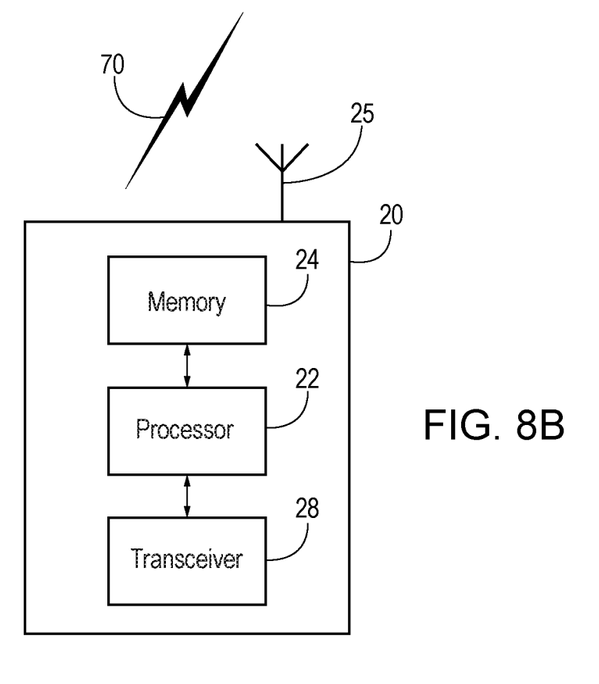
FIG. 8b illustrates an example block diagram of an apparatus, according to another embodiment.

FIG. 8b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8b.

As illustrated in the example of FIG. 8b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10, which may represent one or more access nodes or base stations, such as an eNB or gNB, via a wireless or wired communications link 70 according to any radio access technology, such as 5G or NR.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the signaling diagram depicted in FIG. 3 or the flow diagram illustrated in FIG. 7b.

According to some embodiments, apparatus 20 may be controlled by memory 24 and processor 22 to transmit a SR or BSR to an upstream network node or relay node. In an example embodiment, the upstream network node or relay node may be a relay node that provides a wireless backhaul connection. In an embodiment, apparatus 20 may also be controlled by memory 24 and processor 22 to receive a UL scheduling grant from the upstream network node or relay node. According to an embodiment, apparatus 20 may be further controlled by memory 24 and processor 22 to transmit UL data to the upstream network node or relay node.

It is noted that a RN may include a UE or MT part, such as shown in FIG. 8b, communicating with the upstream node (RN or donor gNB) and a gNB or gNB-DU or RAN part, such as shown in FIG. 8a, communicating with a downstream node (UE/MT part of RN or an access UE). Thus, in some embodiments, the structure and functionality depicted in FIGS. 8a and 8b may be combined into a single node, such as a RN/IAB node containing bot the UE part and gNB part.

It should be understood that the examples described herein are representative of certain embodiments, but other embodiments are also contemplated. For example, there may be other slot structures where the same principles can be applied. Such options may include, for example, the usage of mini-slots where the time granularity is reduced to sub-slots, the usage of code-block-group (GBG) where the data processing can be started when the CBG has been received. Also, in this case, the time granularity can be shorter than a time slot. In addition, according to some embodiments, the slot structures and format of the control information can vary. The slot structure may even be the same on upstream and downstream directions as each RN may have the same capabilities to receive and transmit in either a UL or DL slot format such that a single slot format would be possible (e.g., see FIG. 6). Certain embodiments do not have strict processing requirements but allow at least one slot time to process received data and determine consequent control information (UL grant or scheduling request) to be transmitted on either direction.

Therefore, certain example embodiments provide several technical improvements, enhancements, and/or advantages. Various example embodiments may, for example, minimize latency on an upstream data path and result in the fastest possible resource allocation for a required amount of data. In addition, example embodiments have no ambiguity with the UL grant size. Further, certain embodiments are able to minimize processing requirements and lower costs. Thus, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One embodiment may be directed to a method that may include receiving, by a network node, a scheduling request or other corresponding message from a user equipment or downstream relay node. The method may also include transmitting an uplink scheduling grant to the user equipment or downstream relay node and, before receiving scheduled uplink data from the user equipment or downstream relay node, transmitting the scheduling request or other corresponding message to an upstream relay node or serving node.

Another embodiment may be directed to an apparatus that may include at least one processor and at least one memory comprising computer program code. The at least one memory and computer program code may be configured, with the at least one processor, to cause the apparatus at least to receive a scheduling request or other corresponding message from a user equipment or downstream relay node. The at least one memory and computer program code may also be configured, with the at least one processor, to cause the apparatus at least to transmit an uplink scheduling grant to the user equipment or downstream relay node and, before receiving scheduled uplink data from the user equipment or downstream relay node, to transmit the scheduling request or other corresponding message to an upstream relay node or serving node.

Another embodiment is directed to an apparatus that may include receiving means for receiving a scheduling request or other corresponding message from a user equipment or downstream relay node. The apparatus may also include transmitting means for transmitting an uplink scheduling grant to the user equipment or downstream relay node and, before receiving scheduled uplink data from the user equipment or downstream relay node, for transmitting the scheduling request or other corresponding message to an upstream relay node or serving node.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

What is claimed is:

1. A method, comprising:
   transmitting, by a network node, an uplink scheduling grant to a user equipment or downstream relay nodes served by the network node in a multi-hop backhaul network;
   before receiving scheduled uplink data from the user equipment or the downstream relay nodes, transmitting, by the network node to an upstream serving node providing a wireless backhaul connection in the multi-hop backhaul network, a scheduling request or other corresponding message based on buffer status,
   wherein the transmitting of the scheduling request or other corresponding message is based on the uplink scheduling grant transmitted to the user equipment or downstream relay nodes of the multi-hop backhaul network,
   wherein the buffer status comprises an indicator to indicate an amount of data buffered in the network node and a predicted amount of data to be received in the future by the network node,
   wherein the scheduling request or other corresponding message indicates which volume of data is for the amount of data actually buffered in the network node and which volume of data is for the predicted amount of data, and
   wherein the predicted amount of data is based on the uplink scheduling grant transmitted to the user equipment or the downstream relay nodes served by the network node.

2. The method as in claim 1, wherein the scheduling request or other corresponding message based on buffer status is sent to the serving node before receiving data from the user equipment or relay nodes served by the network node.

3. The method as in claim 1, wherein the scheduling request or other corresponding message based on buffer status is transmitted using an upstream control channel or transmitted as a control information.

4. The method as in claim 1, wherein the scheduling request or other corresponding message based on buffer status indicates receive time of uplink data scheduled by the network node.

5. The method as in claim 1, wherein the scheduling request or other corresponding message based on buffer status is triggered when transmitting uplink scheduling grant to the user equipment or relay nodes served by the network node.

6. An apparatus comprising:
at least one processor; and
at least one memory comprising computer program code,
the at least one memory and computer program code configured, with the at least one processor, to cause the apparatus at least to:
transmit an uplink scheduling grant to a user equipment or downstream relay nodes served by the apparatus in a multi-hop backhaul network;
before receiving scheduled uplink data from the user equipment or the downstream relay nodes, transmit, by the apparatus to an upstream serving node providing a wireless backhaul connection in the multi-hop backhaul network, a scheduling request or other corresponding message based on buffer status,
wherein the transmitting of the scheduling request or other corresponding message is based on the uplink scheduling grant transmitted to the user equipment or downstream relay nodes of the multi-hop backhaul network,
wherein the buffer status comprises an indicator to indicate an amount of data buffered in the network node and a predicted amount of data to be received in the future by the apparatus,
wherein the scheduling request or other corresponding message indicates which volume of data is for the amount of data actually buffered in the network node and which volume of data is for the predicted amount of data, and
wherein the predicted amount of data is based on the uplink scheduling grant transmitted to the user equipment or the downstream relay nodes served by the apparatus.

7. The apparatus as in claim 6, wherein the scheduling request or other corresponding message based on buffer status is sent to the serving node before receiving data from the user equipment or relay nodes served by the apparatus.

8. The apparatus as in claim 6, wherein the scheduling request or other corresponding message based on buffer status is transmitted using an upstream control channel or transmitted as a control information.

9. The apparatus as in claim 6, wherein the scheduling request or other corresponding message based on buffer status indicates receive time of uplink data scheduled by the apparatus.

10. The apparatus as in claim 6, wherein the scheduling request or other corresponding message based on buffer status is triggered when transmitting uplink scheduling grant to the user equipment or relay nodes served by the apparatus.

11. A computer program product comprising at least one non-transitory computer-readable storage medium having executable computer-readable program code portions stored therein, the computer-readable program code portions comprising:
a program code portion configured to transmit, by the computer program product, an uplink scheduling grant to a user equipment or downstream relay nodes served by the computer program product in a multi-hop backhaul network;
before receiving scheduled uplink data from the user equipment or the downstream relay nodes, a program code portion is configured to transmit, by the computer program product to an upstream serving node providing a wireless backhaul connection in the multi-hop backhaul network, a scheduling request or other corresponding message based on buffer status,
wherein the transmitting of the scheduling request or other corresponding message is based on the uplink scheduling grant transmitted to the user equipment or downstream relay nodes of the multi-hop backhaul network,
wherein the buffer status comprises an indicator to indicate an amount of data buffered in the network node and a predicted amount of data to be received in the future by the computer program product,
wherein the scheduling request or other corresponding message indicates which volume of data is for the amount of data actually buffered in the network node and which volume of data is for the predicted amount of data, and
wherein the predicted amount of data is based on the uplink scheduling grant transmitted to the user equipment or the downstream relay nodes served by the computer program product.

12. The computer program product of claim 11, wherein the scheduling request or other corresponding message based on buffer status is sent to the serving node before receiving data from the user equipment or relay nodes served by the computer program product.

13. The computer program product of claim 11, wherein the scheduling request or other corresponding message based on buffer status is transmitted using an upstream control channel or transmitted as a control information.

14. The computer program product of claim 11, wherein the scheduling request or other corresponding message based on buffer status indicates receive time of uplink data scheduled by the computer program product.

* * * * *